June 7, 1927.
T. J. M. DALY
1,631,402
BALE BAND BUCKLE
Filed April 17, 1925
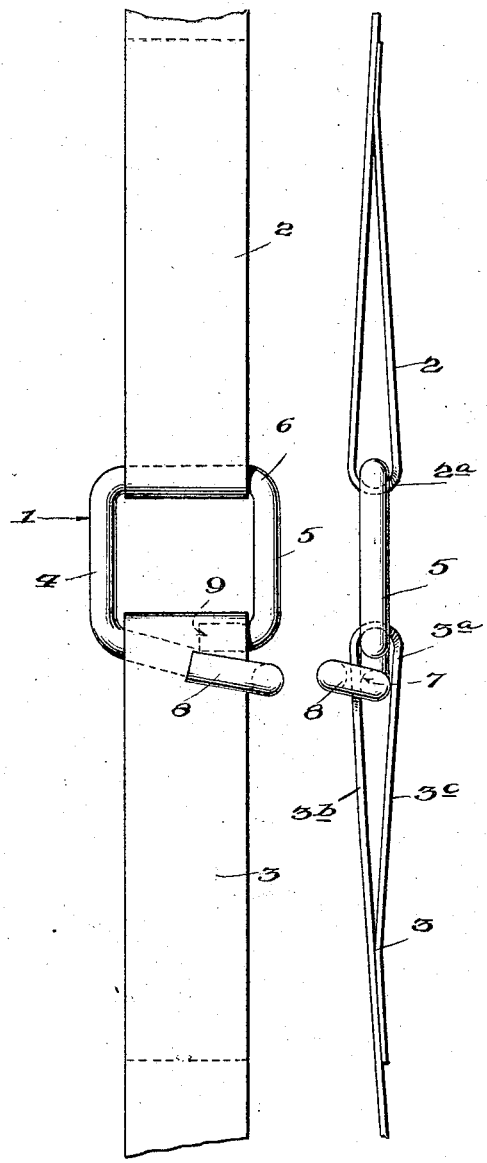
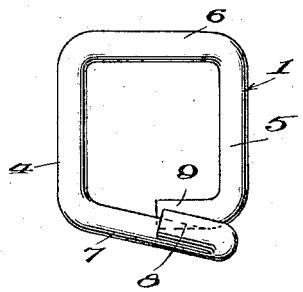
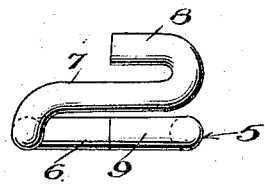
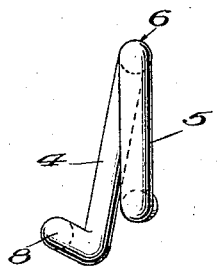
WITNESSES
INVENTOR
T. J. M. DALY,
BY
ATTORNEYS Patented June 7, 1927.

1,631,402

UNITED STATES PATENT OFFICE.

THOMAS J. M. DALY, OF MEMPHIS, TENNESSEE.

BALE-BAND BUCKLE.

Application filed April 17, 1925. Serial No. 23,927.

This invention relates to an improvement in bale band buckles adapted especially for use in tying bands around cotton bales but also adapted for tying bands around other commodities.

The object of the invention resides in the provision of a buckle of this character which is of simple and durable construction and comparatively inexpensive to manufacture, which facilitates the tying of the band and enables the band to be tied much more quickly than with buckles heretofore used, which firmly and securely holds the band against slipping even though the bale should be recompressed after the bands have been applied and the bale permitted to expand.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in front elevation showing a buckle embodying the present invention and associated with the ends of a tie band, Figure 2 is a view in edge elevation of the arrangement shown in Figure 1, Figure 3 is a detail view in front elevation of the buckle, Figure 4 is a view in elevation of the lower end of the buckle, and Figure 5 is a view of the buckle in edge elevation showing how the parts of the same are positioned prior to the time the bail is permitted to expand.

Referring to the drawings, the numeral 1 designates generally the buckle constituting the present invention and the buckle is associated with the ends 2 and 3 of the tie band as will be hereinafter more fully described.

The buckle 1 includes side bars 4 and 5 and an end bar 6 integrally formed with the side bars 4 and 5 and extending transversely between and connecting the side bars at one end of the buckle. The side bar 4 is inclined upwardly or outwardly with respect to the plane of the side bar 5 and end bar 6. At the end of the side bar 4 remote from the end bar 6 an outwardly inclined cross bar 7 is formed. The cross bar 7 is integral with the side bar 4 and at its end the cross bar 7 is provided with an overlying hook 8. The side bar 5 is formed with a cross arm 9 at the end of the side bar opposite or remote from the end bar 6.

The bale buckle has its end bar 6 engaged in the loop 2$^a$ of the end 2 of the bale band prior to the application of the bale band to the bale. The loop 3$^a$ of the end 3 is slipped latterly on to the cross bar 7 and is flexed or twisted so as to have its upper section 3$^b$ run over the cross bar 7 and under the hook 8, its loop 3$^a$ extend around the arm 9 as well as around the cross bar, 7, and its lower run 3$^c$ extend under the arm 9 and bar 7. The inclination of the cross bar 7 facilitates the application of the end 3 to the buckle. With the parts so associated when the bale expands the cross bar 7 will be forced down against the cross arm 9 and into the same plane therewith to completely close the buckle. The hook 8 will crease or bend the upper run 3$^b$ of the end 3 of the band and this has the important advantage of preventing slipping even though the bale be recompressed. The hook 8 also prevents any side slipping of the band and buckle.

In assembling the band with the buckle, the band is bent under before it is slipped over the hook 8 and bar 7 and then it is brought back over the hook 8 and under the extension 9. By inclining the side bar 4 and the cross bar 7 the band is more easily engaged with the buckle. The hook 8 prevents the buckle from slipping out between the runs 3$^b$ and 3$^c$ of the band and this hook has a tendency to prevent the band from slipping through the buckle when the pressure of the bale becomes effective because of the creasing of the band just where it engages the hook 8.

I claim:

1. A buckle comprising a bail-like body having side bars, a cross bar straight between and connecting the side bars at one end, one of the side bars being extended from said cross bar in the plane of the latter and the other side bar inclining normally upward from its end connected with the cross bar toward its other or free end, an end bar extending from the free end of the inclined side bar toward the other side bar and having its extremity returned inwardly in hook form for a portion of the length of the said end bar and above the latter and the other side bar of the bail having at its free end a short inwardly projecting arm in the plane of said side bar and the first named cross bar as and for the purpose set forth.

2. A bale band buckle comprising a pair of side bars, a cross connecting end bar joined to the adjacent ends of the side bars at one end of the buckle, one of said side bars lying in the plane of said end bar and the second side bar being inclined outwardly from said plane and being of greater length than the first side bar, said second side bar having a free end portion turned laterally in the general direction of the first side bar and inclined away from the said cross connecting end bar and also inclined from the plane of the first side bar, said laterally turned end portion of the second side bar having its extremity turned outwardly and rearwardly to produce a hook, said first side bar having at its free end a short extension turned laterally toward the second side bar and terminating a substantial distance from the latter, said laterally turned end portion of the first side bar being located in the plane of the first side bar and said cross connecting bar, the laterally turned end portions of said side bars being adapted to extend into and engage with a loop at an end of a bale band and the bill of said hook being adapted to transversely bend or crease the adjacent portion of said loop of the bale band and to cooperate with the laterally turned end portions of said side bars to prevent slipping of said loop.

THOMAS J. M. DALY.